United States Patent
Anderson et al.

(10) Patent No.: US 8,995,038 B1
(45) Date of Patent: Mar. 31, 2015

(54) OPTICAL TIME DELAY CONTROL DEVICE

(75) Inventors: Michael H. Anderson, Lyons, CO (US);
Scott R. Davis, Denver, CO (US); Scott D. Rommel, Lakewood, CO (US);
George Farca, Denver, CO (US); Seth Trevor Johnson, Louisville, CO (US)

(73) Assignee: Vescent Photonics, Inc., Golden, CO (US)

( * ) Notice: Subject to any disclaimer, the term of this patent is extended or adjusted under 35 U.S.C. 154(b) by 0 days.

(21) Appl. No.: 13/135,500

(22) Filed: Jul. 6, 2011

Related U.S. Application Data (60) Provisional application No. 61/399,135, filed on Jul. 6, 2010.

(51) Int. Cl.
*G02B 26/02* (2006.01)
*G02B 17/02* (2006.01)

(52) U.S. Cl.
CPC ............. *G02B 17/023* (2013.01); *G02B 26/02* (2013.01); *G02F 2201/20* (2013.01); *G02B 2207/117* (2013.01); *Y10S 372/70* (2013.01)
USPC ............................. 359/227; 359/230; 372/700

(58) Field of Classification Search
CPC ................. G02B 26/02; G02B 6/2861; G02B 2207/117; G02F 2201/20
USPC ................ 359/227, 230, 234, 236; 372/9, 24, 372/29.01, 29.016, 29.02, 30
See application file for complete search history.

(56) References Cited

U.S. PATENT DOCUMENTS

| | | |
|---|---|---|
| 3,963,310 A | 6/1976 | Giallorenzi et al. |
| 4,006,967 A | 2/1977 | Kenen et al. |
| 4,737,014 A | 4/1988 | Green |

(Continued)

FOREIGN PATENT DOCUMENTS

| | | |
|---|---|---|
| EP | 1186940 | 3/2002 |
| JP | 59052219 | 3/1984 |
| JP | 63244004 | 10/1988 |

OTHER PUBLICATIONS

Crystech "BBO," obtained from http://www.ilphotonics.com/cdv2/CrystechCrystalsOptics/CrystalsCrystech/Non_Linear_Crystals/BBO.pdf on Jun. 17, 2013.*

(Continued)

*Primary Examiner* — William Choi
*Assistant Examiner* — Marin Pichler
(74) *Attorney, Agent, or Firm* — Trenner Law Firm, LLC; Mark D. Trenner (57) ABSTRACT

An optical time delay control device for controllably altering the transit time of an optical beam between two points. In one example, the device may include an optically transparent solid medium for receiving the optical beam, wherein at least a portion of the medium is generally a parallel piped shape characterized by a height, length and width, wherein the length is larger than the height; two mirrors affixed to two opposing parallel surfaces of the optically transparent solid medium, so that during operation the optical beam reflects between the two mirrors as the optical beam travels through the optically transparent medium; and an angle actuator for controllably altering the angle at which the optical beam enters into the optically transparent medium, thereby controllably altering the time that the optical beam travels through the device. This in effect permits control of the amount of delay of the transmission of light, and delays of 20 nanoseconds have been achieved.

10 Claims, 6 Drawing Sheets

(56) References Cited

U.S. PATENT DOCUMENTS

| | | | |
|---|---|---|---|
| 4,896,325 A | | 1/1990 | Coldren |
| 5,044,712 A | | 9/1991 | Soref |
| 5,132,079 A | | 7/1992 | Stewart et al. |
| 5,255,112 A | * | 10/1993 | Hori et al. .................. 359/196.1 |
| 5,291,567 A | | 3/1994 | Revelli, Jr. et al. |
| 5,301,201 A | | 4/1994 | Dutta |
| 5,317,446 A | | 5/1994 | Mir et al. |
| 5,319,668 A | | 6/1994 | Luecke |
| 5,347,377 A | | 9/1994 | Revelli, Jr. et al. |
| 5,388,169 A | | 2/1995 | Kobayashi et al. |
| 5,499,256 A | | 3/1996 | Bischel et al. |
| 5,504,772 A | | 4/1996 | Deacon et al. |
| 5,513,196 A | | 4/1996 | Bischel et al. |
| 5,596,671 A | | 1/1997 | Rockwell, III |
| 5,766,974 A | | 6/1998 | Sardella et al. |
| 5,789,776 A | | 8/1998 | Lancaster et al. |
| 5,837,613 A | | 11/1998 | Kalnitsky et al. |
| 5,965,691 A | | 10/1999 | Gibbons |
| 6,041,071 A | | 3/2000 | Tayebati |
| 6,178,035 B1 | * | 1/2001 | Eda et al. ...................... 359/326 |
| 6,205,159 B1 | | 3/2001 | Sesko |
| 6,215,928 B1 | | 4/2001 | Friesem et al. |
| 6,324,204 B1 | | 11/2001 | Deacon |
| 6,330,388 B1 | | 12/2001 | Bendett et al. |
| 6,373,872 B2 | | 4/2002 | Deacon |
| 6,449,084 B1 | | 9/2002 | Guo et al. |
| 6,470,036 B1 | | 10/2002 | Bailey et al. |
| 6,480,513 B1 | | 11/2002 | Kapany et al. |
| 6,546,163 B2 | | 4/2003 | Thackara |
| 6,559,921 B1 | | 5/2003 | Leslie et al. |
| 6,594,408 B1 | | 7/2003 | Noe |
| 6,603,902 B1 | | 8/2003 | So |
| 6,608,952 B2 | | 8/2003 | Eggleton et al. |
| 6,650,822 B1 | | 11/2003 | Zhou |
| 6,661,936 B2 | | 12/2003 | Noe |
| 6,763,047 B2 | | 7/2004 | Daiber et al. |
| 6,768,856 B2 | | 7/2004 | Akwani et al. |
| 6,813,417 B2 | | 11/2004 | Oh et al. |
| 6,816,140 B2 | | 11/2004 | Fujieda |
| 6,816,516 B2 | | 11/2004 | Daiber |
| 6,853,654 B2 | | 2/2005 | McDonald et al. |
| 6,859,567 B2 | | 2/2005 | Galstian et al. |
| 6,859,572 B2 | | 2/2005 | Ishibashi |
| 6,920,159 B2 | | 7/2005 | Sidorin et al. |
| 7,079,724 B2 | | 7/2006 | Thackara |
| 7,315,665 B1 | | 1/2008 | Anderson |
| 7,403,678 B2 | | 7/2008 | Thapliya et al. |
| 7,570,320 B1 | | 8/2009 | Anderson et al. |
| 8,311,372 B2 | | 11/2012 | Anderson et al. |
| 2001/0033400 A1 | | 10/2001 | Sutherland et al. |
| 2002/0031299 A1 | | 3/2002 | Hatakoshi |
| 2002/0041412 A1 | * | 4/2002 | Hajjar et al. .................. 359/128 |
| 2002/0041726 A1 | | 4/2002 | Thackara |
| 2002/0131694 A1 | | 9/2002 | So et al. |
| 2002/0140879 A1 | | 10/2002 | Fujieda |
| 2002/0150362 A1 | * | 10/2002 | Gutin et al. ................... 385/122 |
| 2002/0154878 A1 | | 10/2002 | Akwani et al. |
| 2002/0181880 A1 | | 12/2002 | Dautartas et al. |
| 2003/0048817 A1 | | 3/2003 | Steffens |
| 2003/0059148 A1 | | 3/2003 | Nishizawa et al. |
| 2003/0086448 A1 | | 5/2003 | Deacon |
| 2003/0103708 A1 | | 6/2003 | Galstian et al. |
| 2003/0108273 A1 | | 6/2003 | Kowalczyk et al. |
| 2003/0137999 A1 | | 7/2003 | Spiegelberg et al. |
| 2003/0142262 A1 | | 7/2003 | Leslie et al. |
| 2003/0169958 A1 | | 9/2003 | Ridgeway et al. |
| 2003/0214059 A1 | | 11/2003 | Itoh |
| 2003/0214700 A1 | | 11/2003 | Sidorin et al. |
| 2003/0219197 A1 | | 11/2003 | Kawamoto |
| 2003/0231279 A1 | | 12/2003 | Wessel et al. |
| 2004/0057475 A1 | * | 3/2004 | Frankel et al. .................. 372/25 |
| 2004/0129949 A1 | * | 7/2004 | Deliwala et al. .............. 257/194 |
| 2004/0208412 A1 | | 10/2004 | Miyazaki et al. |
| 2004/0264902 A1 | | 12/2004 | Zoorob et al. |
| 2005/0047739 A1 | | 3/2005 | Parker et al. |
| 2005/0135439 A1 | | 6/2005 | Chapman et al. |
| 2005/0180713 A1 | | 8/2005 | Heideman et al. |
| 2005/0265403 A1 | * | 12/2005 | Anderson et al. ............... 372/20 |
| 2005/0271325 A1 | | 12/2005 | Anderson et al. |
| 2008/0008413 A1 | | 1/2008 | Anderson et al. |
| 2008/0008414 A1 | | 1/2008 | Anderson et al. |
| 2008/0013587 A1 | * | 1/2008 | Tempea et al. .................. 372/93 |
| 2008/0161648 A1 | | 7/2008 | Karasawa |
| 2009/0003841 A1 | | 1/2009 | Ghidini et al. |
| 2012/0269478 A1 | | 10/2012 | Anderson et al. |

OTHER PUBLICATIONS

Almaz Optics "Potassium Titanyl Phosphate (KTP)," obtained from http://www.almazoptics.com/KTP.htm on Jun. 17, 2013.*

Precision Micro-Optics "Optical Grade Silicon Wafers," Feb. 19, 2010, Obtained from http://www.pmoptics.com/files/Optical_Silicon_wafer.pdf on Jun. 18, 2013.*

Li et al. "Radiation Hardness of High Resistivity Magnetic Czochralski Silicon Detectors After Gamma, Neutron, and Proton Radiations," Aug. 2004, IEEE Transactions on Nuclear Science, vol. 51, No. 4, 1901-1908.*

International Search Report for Int. Application No. PCT/US2005/001758 dated Aug. 31, 2006, 2 pp.

Written Opinion for Int. Application No. PCT/US2005/001758 dated Aug. 31, 2006, 3 pp.

International Search Report for Int. Application No. PCT/US2005/001586 dated Sep. 21, 2006, 3 pp.

Written Opinion for Int. Application No. PCT/US2005/001586 dated Sep. 21, 2006, 3 pp.

Desmat, et al., "Silicon-on-Insulator Optical Waveguides with Liquid Crystal Cladding for Switching and Tuning", Proceedings of the European Conference on Optical Communication (ECOC) 2003, vol. 3, (2003), p. 430-431.

Mormile, et al., "A Basic Element for Integrated Electro-Optical Devices Based on Liquid Crystal Waveguides", Proc. SPIE 4078, (2000), p. 779-85.

Kobayasi et al., "2x2 Optical Waveguide Matrix Switch Using Nematic Liquid Crystal", IEEE Journal of Quantum Electronics, vol. QE-18, No. 10, 1982.

Casson, et al., "Near-IR Turnable Laser with an Integrated LiTaO3 Electro-Optic Deflector", Applied Optics, vol. 41, No. 30, Oct. 20, 2002.

Hermann, "Integrated Optics with Liquid Crystals", University of Technology, 2000.

Clark, et al., "Surface-Stabilized Ferroelectric Liquid-Crystal Electro-Optic Waveguide Switch", Applied Physics Letter 57(18), Oct. 29, 1990.

Coppola, et al., "Optoelectronic Router in Glass Waveguide with a Liquid Crystal Cladding", SPIE, vol. 4829, 2003.

Gialorenzi, et al., "Lighting Scattering from Smectic Liquid-Crystal Waveguides", Journal of Applied Physics, vol. 47, No. 5, May 1976.

Karpierz, "Nonlinear Properties of Waveguides with Twisted Nematic Liquid Crystal", Acta Physica Polonica A, vol. 99, 161-176, 2001.

Maune, et al., "Electronically Tunable Ring Resonators Incorporating Nematic Liquid Crystals as Cladding Layers", Applied Physics, vol. 83, No. 23, 2003.

Okamura, et al., "Low Voltage Driving in Nematic Liquid Crystal Overlayered Waveguide" Journal of Lightwave Technology, vol. LT-4, No. 3, Mar. 1986.

Sirleto, et al., "Optical Multimode Interference Router Based on a Liquid Crystal Waveguide", Journal of Optics A: Pure Appl. Opt. 5, 2003.

Sirleto, et al., Electro-Optical Switch and Continuously Tunable Filter Based on a Bragg Grating in a Planar Waveguide with a Liquid Crystal Overlayer, Opt. Eng. 41(11), Nov. 2002.

Valera, et al., "Bistability and Switching in Thin-Film Waveguides with Liquid-Crystal Cladding", Applied Physics Letter 48(9), Mar. 3, 1986.

Hu, et al., "Optical Deflection in Thin-Film Nematic Liquid-Crystal Waveguides", IEEE Journal of Quantum Electronics, vol. QE-10, No. 2, Feb. 1974.

(56) References Cited

OTHER PUBLICATIONS

Whinnery, et al., "Liquid-Crystal Waveguides for Integrated Optics", IEEE Journal of Quantum Electronics, vol. QE-13, No. 4, Apr. 1977.
Hu, et al., "Losses of a Nematic Liquid-Crystal Optical Waveguide", Journal of the Optical Society of America, vol. 64, No. 11, Nov. 1974.
Repasky, et al., "Tunable External-Cavity Diode Laser Based on Integrated Waveguide Structures", Opt. Eng. 42(8), Aug. 2003.
Oh Kee Kwan, et al., "Proposal of Electrically Tunable External-Cavity Laser Diode", IEEE Photonics Technology Letters, vol. 16, No. 8, Aug. 2004.
Sheridan, et al., "Elector-Optically Induced Deflection in Liquid-Crystal Waveguides", Journal of Applied Physics, vol. 45, No. 12, Dec. 1974.
Sneh, et al., "High-Speed Continuously Tunable Liquid Crystal Filter for WDM Networks", Journal of Lightwave Technology, vol. 14, No. 6, Jun. 1996.
Gialorenzi, et al., "Light Scattering from Nematic Liquid-Crystal Waveguide", Journal of Applied Physics, vol. 46, No. 3, Mar. 1975.
Schnur, et al., "Prospectus for the Development of Liquid-Crystal Waveguides", Naval Research Laboratory, NRL Report 7507, Nov. 10, 1972.
European Search Report from corresponding European patent application (05722475.0) dated Nov. 22, 2007.
Liu, Zao, "Polarization Cross Coupling in Asymmetric Photonic Waveguides", Electrical and Computer Engineering Master's Theses, Northeastern University, Dept. of Electrical and Computer Engineering, Jan. 1, 2010.

* cited by examiner

OPTICAL TIME DELAY CONTROL DEVICE

CROSS-REFERENCE TO RELATED APPLICATIONS

This application claims the benefit under 35 U.S.C. 119(e) to U.S. Provisional Patent Application No. 61/399,135 filed Jul. 6, 2010 entitled "Optical True Time Delay Device" the disclosure of which is hereby incorporated by reference in its entirety.

STATEMENT REGARDING FEDERALLY SPONSORED RESEARCH

The invention was made with U.S. Government support under contract number HQ0147-11-C-7625 awarded by the Missile Defense Agency. The U.S. Government has certain rights in the invention.

FIELD

This invention relates, in general, to devices for controlling the delay of light propagation.

BACKGROUND

There are numerous applications where it is desirable to have a controllably adjustable time delay over a beam of light. Unfortunately, controllably altering the time delay of light beams, especially light beams that are encoded with high frequency signals (often extremely high frequencies of 30 GHz or even higher) has proven to be a formidable challenge. For instance, the desired performance requirements for current and future phased array antennas (PAAs)—an application where the inventors recognize can benefit from time delay devices—can be daunting. An at least partial list of some of the challenging requirements include:

Large time delay tunability: PAAs can be quite large, sometimes spanning several meters. In order to maintain uniform phase fronts of the steered radiation from these large arrays a delay tunability of up to 20 nanoseconds or possibly even larger is desired.

True time delay (TTD) operation: For high bandwidth operation an actual true-time-delay is desired. Constant phase delay devices yield undesirable squint and resonant based group velocity devices (e.g. slow light or MEMs filter approaches) limit the flexibility and/or bandwidth of the RF or microwave signal. A true time delay, realized by altering either the phase velocity (not the group velocity) or the path length, may be advantageous.

Low and constant insertion loss: Since the RF or microwave signal is inherently an analog signal, any attenuation results in an inherent reduction in the signal to noise. Furthermore, time delay dependent insertion loss may causes undesirable distortions of the PAAs radiation pattern and therefore should be minimized. A low (ideally <2 dB) and constant (variations in loss of <0.5 dB as the time delay is altered) insertion loss is desired.

Compact and highly integrable form factor: To accommodate large PAAs, which may have hundreds or even thousands of array elements, the TTD device should be compact and, importantly, highly integrable. In other words, the form-factor should enable convenient and cost-effective integration of many independent TTD channels.

Even though these design challenges are considerable, the importance of the application has motivated numerous past efforts. Examples include all electronic approaches such as MEMs RF switches, wherein the signal is selectively routed through RF micro-strips of different lengths. The switches can be extremely low loss (<0.1 dB per switch) and high bandwidth (up to 40 GHz has been demonstrated), but inherent propagation losses in the RF micro-strips prove limiting for realizing large time delays. For example in the publication Hacker, J. B., Mihailovich, R. E., Kim, M., and DeNatale, J. F., "A Ka-Band 3-bit RF MEMS True-Time-Delay Network," IEEE Transactions of Microwave Theory and Techniques 51, 305-308 (2003), 2.5 dB of insertion loss was required to realize 4-bit tuning over a 20 psec range. While this performance is impressive and is certainly suited for small $\Delta T$ tuning, extending this to 8-bits and 20 nsecs is not practical; the insertion losses would be over 1000 dB.

To circumvent these transmission losses, to provide for extremely high bandwidth, and for numerous other reasons (cost, EMI immunity, size, etc.), there has been considerable past effort at realizing TTD devices in the optical domain. Briefly, the RF signal may be encoded onto a laser, this encoded laser may then be split into the desired number of channels (one channel for each array element), and each of these channels may be independently delayed with a photonic-true-time-delay (PTTD) device. After the delay is performed, and prior to each antenna array element, a high-speed photodiode may be used to convert the optical signal back into an electronic signal. While in principle this optical approach is sound, and it leverages the significant technology development realized by the telecommunications industry, in practice the key component, i.e. an ideal PTTD device, has proven elusive. This is not for lack of trying; over the past 25 years numerous approaches have included: i) optical MEMs, ii) liquid crystal spatial light modulators, iii) laser wavelength tuning designs, iv) acousto-optic schemes, and v) optical switches to direct the signal through coils of different length fibers.

Previous approaches for controllably altering an optical time delay have also included waveguide or fully integrated approaches. In these approaches, typically the optical beam is confined to a waveguide structure as it travels through the device, i.e., it is not a free propagating beam but rather a confined or guided beam. In these prior devices, integrated waveguide switches have been used to direct the beam through shorter or longer waveguide paths, thereby altering the optical transit time. The problem with these approaches has been that the waveguide losses are significant. In order to alter the optical transit time or delay over several nanoseconds, as is required, the optical path length must be changed by several feet. In these prior approaches, this necessitated travelling through many feet of waveguide, which in turn causes large optical losses (e.g., greater than 30 dB of attenuation).

Nevertheless, the challenge of simultaneously providing 20 nsec or more of tunability, low insertion loss (<2 dB), high resolution (up to 8-bit), large integrability (up to 1000 independent channels), and a robust, compact, and cost effective form-factor is believed to still remain unfulfilled.

SUMMARY

In light of the above and according to one broad aspect of one embodiment of the present invention, disclosed herein is an optical time delay control device for controllably altering the transit time of an optical beam between two points. In one example, the device may include an optically transparent solid medium for receiving the optical beam, wherein at least a portion of the medium is generally a parallelpiped shape characterized by a height, length and width, wherein the length is larger than the height; two mirrors affixed to two opposing parallel surfaces of the optically transparent solid medium, so that during operation the optical beam reflects between the two mirrors as the optical beam travels through the optically transparent medium; and an angle actuator for controllably altering the angle at which the optical beam enters into the optically transparent medium, thereby controllably altering the time that the optical beam travels through the device. This in effect permits control of the amount of delay of the transmission of light, and delays of 20 nanoseconds have been achieved.

In one example, the optically transparent solid medium is constructed from silicon, and the mirrors may be constructed from a stack of dielectric layers. The angle actuator may be implemented in various manners, and in one example is a liquid crystal waveguide beamsteerer. If desired, the optically transparent solid medium is constructed from magnetic Czochralski silicon. In another example, the optically transparent solid medium is constructed from highly transparent glass.

According to another embodiment of the present invention, disclosed herein is a device for controllably altering the transit time of an optical beam, the device comprising: an angle actuator receiving the optical beam and transmitting the optical beam at an angle that is controllable; and an optical path reflector receiving at one end the optical beam and discharging the optical beam an another end, the optical path reflector being generally elongated and having a length larger than a height and having two mirrored opposing surfaces, the optical path reflector being made of optically transparent material; wherein as the angle actuator alters the angle at which the optical beam enters into the optical path reflector, the time that the optical beam travels through the device is changed.

The features, utilities and advantages of the various embodiments of the invention will be apparent from the following more particular description of embodiments of the invention as illustrated in the accompanying drawings.

DETAILED DESCRIPTION

Figure 1:
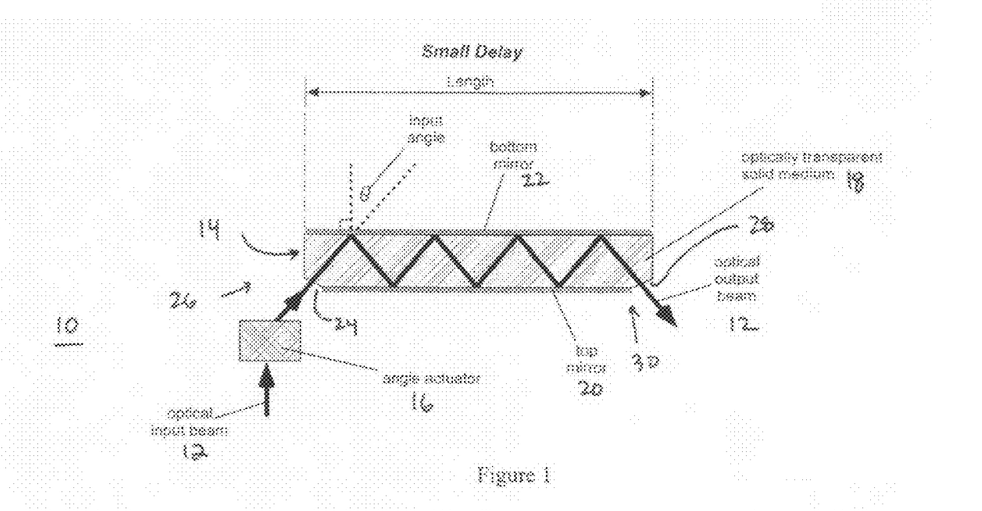
FIG. 1 illustrates a sectional view of an example of an optical time delay control device whereby controllably altering the launch angle controllably alters the transit time, and a small delay time is illustrated, in accordance with one embodiment of the present invention.
Figure 2:
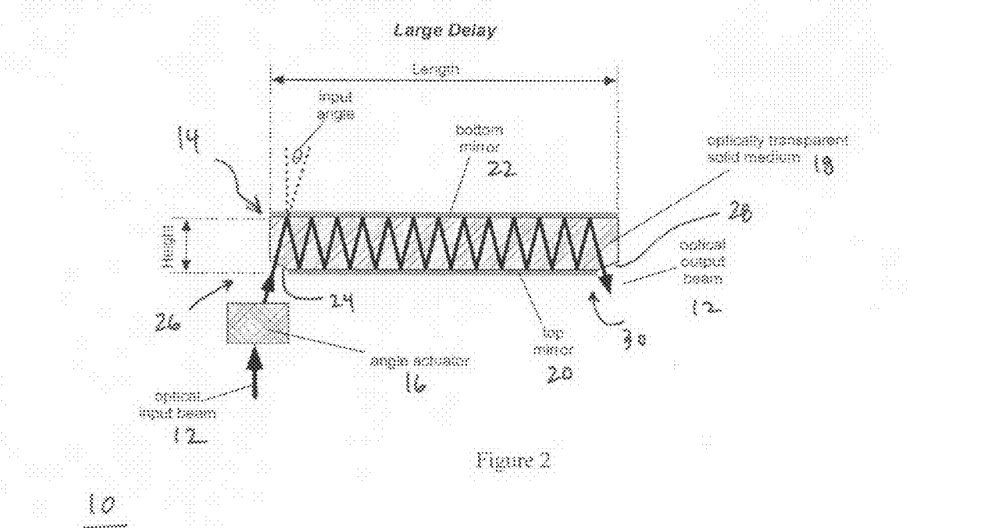
FIG. 2 illustrates a sectional view of an example of an optical time delay control device whereby controllably altering the launch angle controllably alters the transit time, and a larger delay time is illustrated when compared with FIG. 1, in accordance with one embodiment of the present invention.
Figure 3:
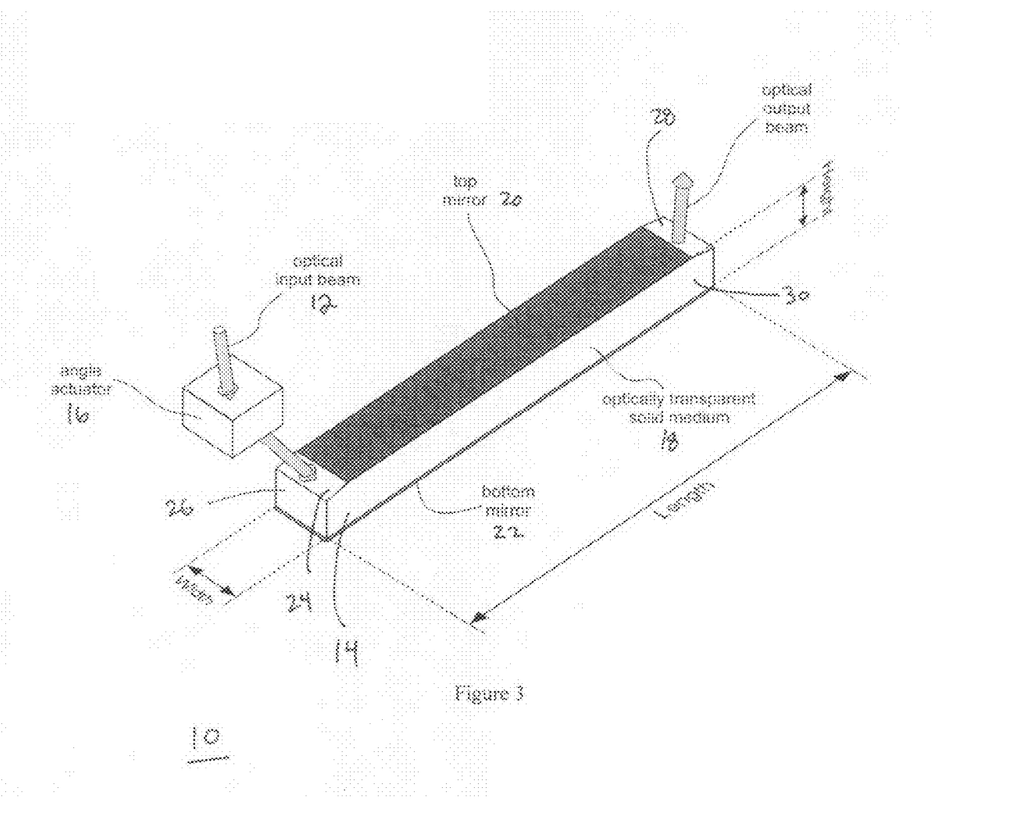
FIG. 3 illustrates a perspective view of an example of an optical time delay control device of FIGS. 1-2, in accordance with one embodiment of the present invention.

In light of the above and according to one broad aspect of one embodiment of the invention, disclosed herein is an optical time delay control device 10 for dynamically controlling the transit-time or time-delay of light 12 passing through the device. In one example of the invention, the time delay control device 10 may include at least two sub components 14, 16. The first sub-component may be referred to as an optical path reflector 14, which defines the medium or cavity 18 in which light 12 travels within the device 10 and which defines/compresses the total size of the device 10 into a compact form factor. As shown in FIG. 1-3, the optical path reflector 14 may be formed from an optically transparent solid medium 18 having a top mirror 20 and a bottom mirror 22 on the top and bottom surfaces of the medium 18. The mirrors 20, 22 are preferably in a parallel relation to one another. The medium 18 may be made of a material such as silicon, and may be generally elongated and rectangular which can be formed as a parallel piped shape wherein the length is larger than the height. The medium 18 may also include a beveled edge 24 about the first end 26 of the medium, and a beveled edge 28 about the second end 30 of the medium, the beveled edges being provided to aid in the coupling of the light beam 12 into and out of the medium 18 in FIGS. 1-3.

The second sub-component may be referred to as an angle actuator 16, which controllably alters the angle at which light 12 enters the optical path reflector 14 and thereby controllably alters the transit time of the light. The angle actuator 16 is positioned on the front end 26 of the optical time delay control device 10, and receives an input beam 12. Based on the desired delay time that is sought, the angle actuator 16 controls and alters the input angle θ of the light beam into the optical path reflector 14. As disclosed herein, the angle actuator 16 can be implemented using a liquid crystal beemsteering waveguide 32, as described herein and/or for instance as disclosed in U.S. patent application Ser. No. 10/963,946, filed Oct. 12, 2004, entitled "Liquid Crystal Waveguide Having Refractive Shapes for Dynamically Controlling Light" and U.S. Pat. No. 7,720,116 entitled "Tunable Laser Having Liquid Crystal Waveguide," and U.S. patent application Ser. No. 12/660,028 filed Feb. 17, 2010 entitled "Electro-Optic Beam Deflector Device," the disclosures of which are hereby incorporated by reference in their entirety. Alternatively, if desired, the angle actuator 16 can be implemented using traditional mechanical structures for controlling the angle of a light beam, such as galvanic mirrors, or micro electronic mechanical devices such as MEMs could be used.

As recognized by the present inventors, to alter the transit time of a light beam through a device, one may alter the optical path length of the device, i.e., it requires more time to travel a longer length and less time to travel a shorter length. In general, in order to realize a large amount of transit time tuning one requires a large amount of optical path length tuning. For example, to realize a time delay tunability of 20 nanoseconds, as may be required for some applications, one would need to change the optical path length by approximately 20 feet.

For many applications 20 feet can be too large. Therefore, as one aspect of the current invention, a multi-pass optic, shown in FIGS. 1-3 as the optical path reflector 14, is used to fold this large path length change into a much smaller package. As a further aspect of one embodiment of this invention, the optical path reflector 14 may contain two parallel mirrors or reflectors or reflective surfaces 20, 22, such that the light beam that enters on one end of the device 10 will reflect or bounce inside the medium 18 of the optical path reflector 14 several times before exiting at the other end of the device. By controllably altering the angle at which the light beam 12 enters the optical path reflector 14, the number of bounces or reflections inside the device may be controllably altered. Since more bounces within the optical path reflector 14 results in a longer total path length through the device, this therefore creates a longer transit time. In this way the optical path length of a beam of light 12 travelling through the device 10 may be controllably altered and therefore the transit time or time delay is controllably altered. Furthermore, the geometry of the optical path reflector 14 contains the total optical path length into a compact form factor. In this way, a large change in optical path length—ard resulting large delay times—may be realized in a small and compact device 10.

Moreover, in one embodiment of the present invention, the light 12 between the two mirrors 20, 22 is a free propagating beam, i.e., it is not a guided wave. As such, the problematic waveguide losses that limited the prior approaches, described above in the Background, are circumvented. In one example of the invention, waveguide-based beamsteerers 32 (FIGS. 4-7) are provided as an example of an angle actuator 16 to controllably alter the optical input angle, but in this example the light is only travelling a few millimeters though the waveguide 32 before it is launched into the optical path reflector 14, non-waveguide region between the two mirrors 20, 22. In this approach, since the waveguide path length of the angle actuator 16 is so small, the waveguide losses are therefore significantly less when compared with prior approaches described above in the Background section. In this embodiment of the present invention, the long path length propagation within the optical path reflector 14 is as a very low-loss unguided beam as the light reflects between the mirrors, and not as a lossey guided beam as in the prior approaches described above.

In one example, for operation on light beams with a wavelength in the near infrared (e.g., approximately 1.5 micron wavelength, or in the range of approximately 1.1 microns to 2.5 microns wavelength), the optical path reflector 14 may be constructed from a solid slab of silicon, with dielectric mirrors coated directly onto parallel surfaces, thereby providing a rugged monolithic construction. Since silicon has a high index of refraction (n>3) the total size of the device may be further reduced. Furthermore, the propagation of light inside of the multipass region of the medium 18 of the optical path reflector 14 may be a "free space" beam, which circumvents guided-wave scattering losses or attenuation that are experienced with some conventional devices. This embodiment of the present invention therefore combines the ruggedness of an integrated optic with the low propagation loss of a free space optic.

As another aspect of the current invention, the geometry of the optical path reflector 14 may be chosen to provide for both the desired total time delay tunability and the resolution or time-difference between adjacent time-delay settings. FIGS. 1-3 show an examples of an optical path reflector wherein the height, H, and the length, L, are defined. Light enters at one end and reflects between the two sides.

The height H of the reflector may be chosen to provide for a desired delay step size $\delta\tau$. Using the small angle approximation gives $$\delta\tau \approx \frac{2H}{c/n},$$

where n is the refractive index of the optical path reflector medium and c is the speed of light in vacuum. To alter the transit time of a light beam through the device, i.e., to alter the time delay, one may alter the input angle and thereby alter the number of bounces or reflections that the light beam incurs while traveling through the devices. The change in the number of bounces $\Delta N$ required to provide a change of $\Delta\tau$ in the transit time is $\Delta\tau = \Delta N \delta\tau$.

Furthermore, the total transit time of light 12 through the device 10 determines the total optical path length that the light beam 12 must travel through the optical path reflector medium 18. In another aspect of this invention one may define the spot size of the light beam at the entrance, $\omega_o$, such that the total optical path length is less than twice the Raleigh length of the light beam. In this way one may controllably set how much the light beam will diverge or expand as it travels through the optical path reflector. Furthermore, the Raleigh length may be related to the maximum time delay by $$Z_R = \frac{\pi \omega_0^2 n}{\lambda} = \delta\tau N_{max} \, c/n$$
$$= (\Delta\tau + \tau_0) c/n$$

where $\Delta\tau$ is the total tunable time delay, and $\tau_o$ is a starting delay value, Rearrangement shows that $\Delta\tau \sim n^2$ which shows the benefit of a high index material.

Furthermore, in another aspect of this invention, the total length of the optical path reflector, L, may be chosen by multiplying the light beam spot diameter by the maximum number of bounces $$L = N_{max} 2\alpha\omega_o,$$

where $\alpha$ may be chosen to meet a crosstalk requirement at the exit.

In another example of one aspect of the invention, the angle at which the light beam 12 enters the optical path reflector 14, as defined by $\theta$ (see FIGS. 1-2, 4-5), may be controllably altered by an electro-optic beamsteering device 32 that is provided as the angle actuator 16 at one end of the optical path reflector 14. In another example, electro-optic angle actuators 16 or beamsteerers 32 may be used to both launch and catch the light into and out of the optical path reflector 14, as shown in FIGS. 5-7.

Figure 4:
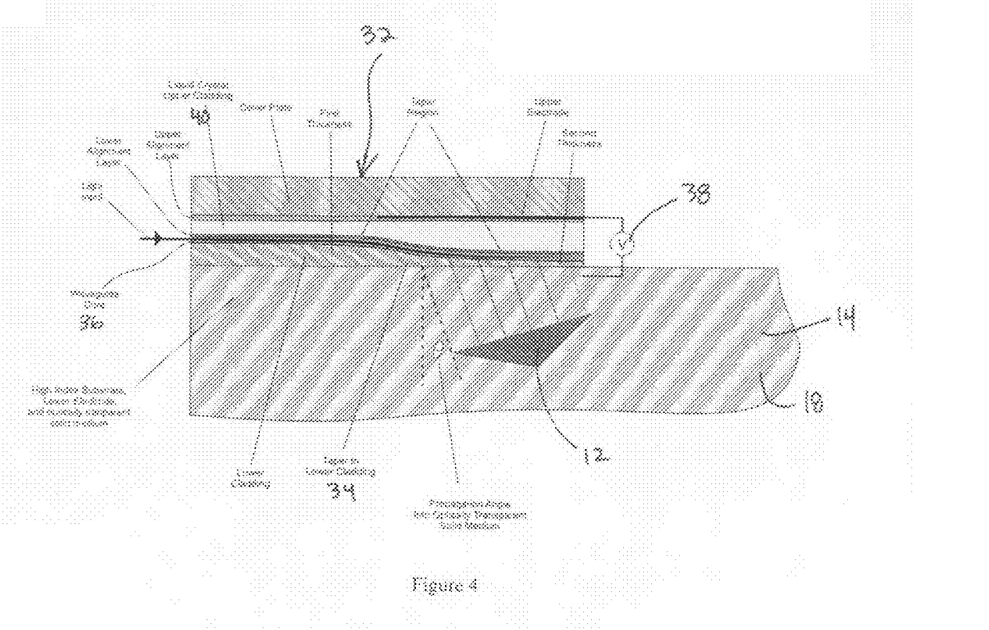
FIG. 4 illustrates a sectional view of a portion of an example of an electro-optic beamsteering actuator formed from a tapered waveguide coupler with a liquid crystal overlay, in accordance with one embodiment of the present invention.
Figure 5:
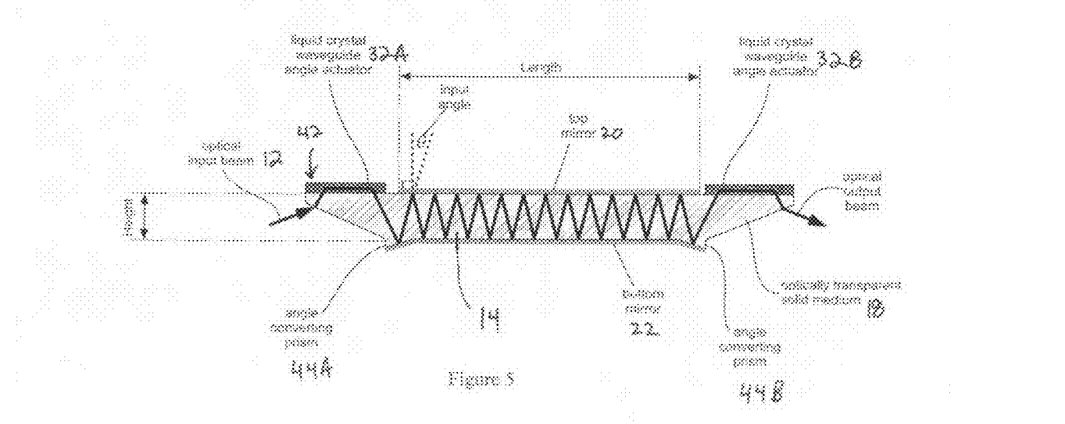
FIG. 5 illustrates a sectional view of an example of an optical time delay control device having an electro-optic angle actuator used to control the number of reflections in the optical path reflector, in accordance with one embodiment of the present invention.
Figure 6:
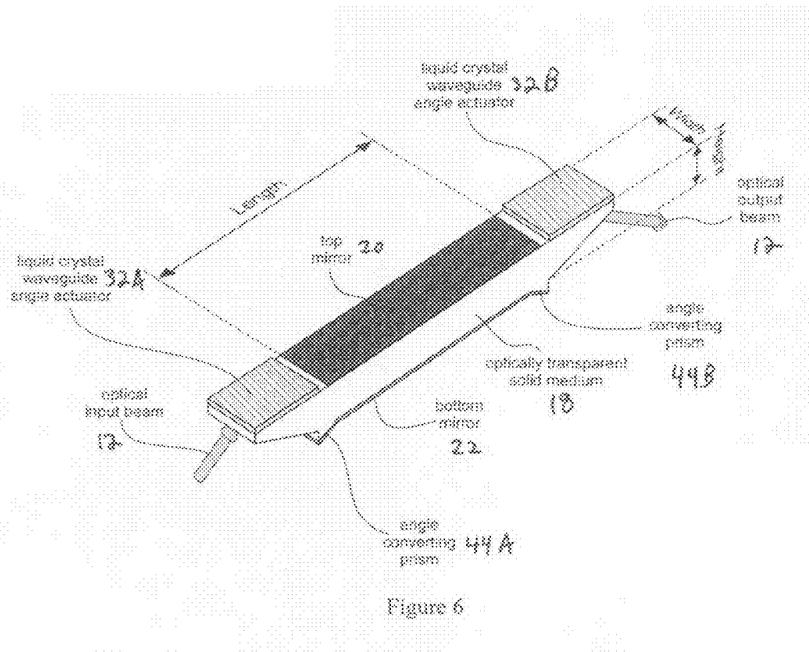
FIG. 6 illustrates a perspective view of an example of an optical time delay control device of FIG. 5, in accordance with one embodiment of the present invention.
Figure 7:
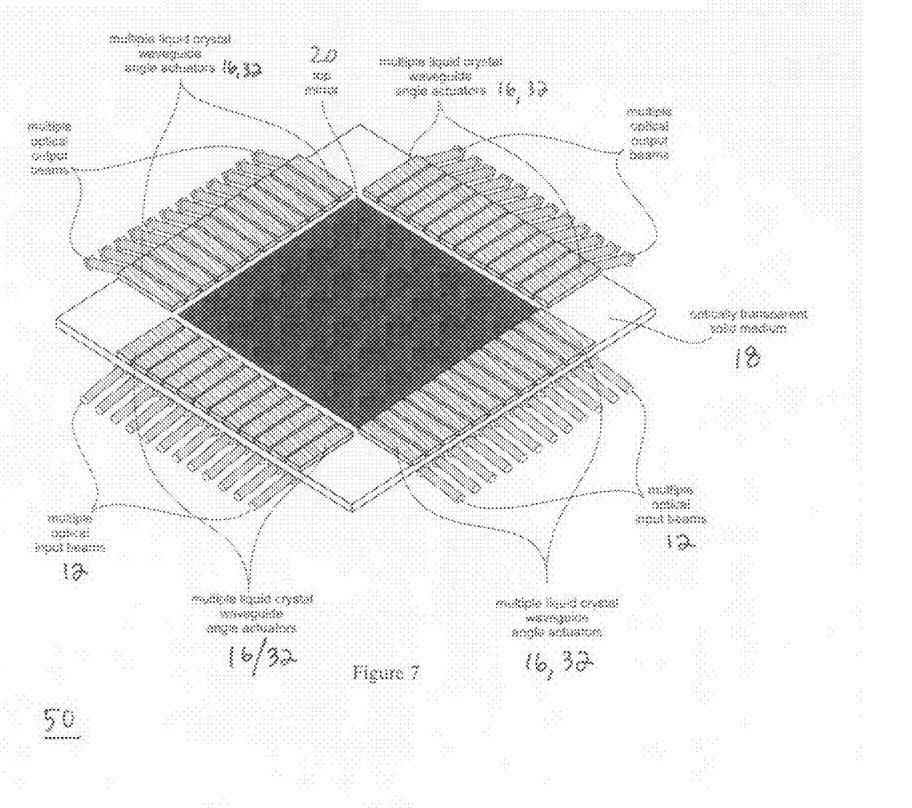
FIG. 7 illustrates a perspective view sectional an example of an optical time delay control device with multiple channels, in accordance with one embodiment of the present invention.

In one example the electro-optic beamsteerers 32 may be constructed from a liquid crystal clad waveguide (e.g., FIGS. 4-6). In one embodiment these liquid crystal clad waveguide beamsteerers 32 or angle actuators may be affixed directly to the input and/or output regions of the optical path reflector 14, as shown in FIGS. 4-6. In one example in FIG. 4, the electro-optic angle actuators utilize a tapered sub-cladding 34, so that the evanescent field of the guided light comes into contact with the higher index optical path reflector material 18. In general, the evanescent field of light propagating in a waveguide comes into contact with a substrate whose index is higher than the mode index, then light may couple from the core 36 of the waveguide into the higher index material. The thickness of the subcladding 34 may control the strength of coupling between the core 36 and high index medium 18. Therefore, by choosing or constructing an appropriate shape of the sub-cladding taper (from thicker to thinner) one may choose or construct the shape of the beam 12 that leaves the waveguide 32 and enters into the higher index medium 18.

The voltage 38 applied to the waveguide 32 alters the angle at which light 12 exits the waveguide 32 and enters the optical path reflector 14.

Referring to FIG. 4, light 12 may propagate inside the waveguide core 36 into a region where the lower cladding 34 is tapered from a first thickness down to a second smaller thickness, thereby allowing the evanescent field to come into contact with a higher index material 18. In one example this higher index material 18 may be silicon. In another example this higher index material 18 may also be the entrance or exit to the optical path reflector. The angle at which the light beam 12 leaves the waveguide and enters into the higher index material may be given by the condition for total internal reflection $$\sin\theta = \frac{n_{eff}}{n_{silicon}}$$

$$\sim \frac{1.85}{3.45} \Longrightarrow \theta = 32°$$

where $n_{eff}$ is the effective index of the guided wave. By adding a liquid-crystal layer 40 over the coupling region the effective index may be tuned enabling tuning of the out-coupling angle θ. In one example this out-coupling angle may also be the angle at which the light beam enters into the optical path reflector, or it may be related to that angle.

Implicit differentiation of the above equation gives the angular tuning range $$\Delta\theta = \frac{n_{eff}}{n_{silicon}} \frac{1}{\cos\theta}$$

$$\approx \frac{0.05}{(3.45)(0.85)}$$

$$= 1° \text{ (in silicon).}$$

In the last expression we used an index modulation, i.e., the amount by which we may tune the effective index of the waveguide, of $\Delta n_{eff}$=0.05.

In another aspect of the present invention, the liquid crystal waveguide beamsteerers 32 may be integrated directly onto the optical path reflector 14. An example is shown in FIGS. 5-6. In this way an electro-optic (EO) beamsteerer 32 at the input of the optical path reflector 14 may be used to control the number of reflections inside the optical path reflector 14 and therefore control the total transit time of light 12.

Furthermore, as shown in FIGS. 5-6, a passive tapered waveguide coupler 42 may be used to couple light into a waveguide section adjacent to the optical path reflector 14, and a angle converting prism 44 may be used to couple the light 12 from the waveguide 32A into the optical path reflector 14. The passive tapered coupler 42 may be similar to the structure of FIG. 4, but where the coupling angle is held at a constant angle. In one example, the output angle from the liquid crystal waveguide electro-optic beamsteerer 32A is 32° and may be deflected, by a small silicon prism 44A optically contacted to the underside of the medium/substrate 18, into a desired angle into the optical path reflector 14.

In another example, the liquid crystal waveguide electro-optic beamsteerers may be formed directly onto the surface of a silicon prism that may then be affixed to the optical path reflector.

In another example, and also as shown in FIGS. 5-6, a liquid-crystal electro-optic beamsteerer 32B may be used at the output of the optical path reflector 14 to catch the light beam 12 as it comes out of the optical path reflector at different angles. In this way the output light beam 12 may always be directed onto a stationary small aperture, such as a small detector or an optical fiber, regardless of the number of bounces, i.e. regardless of the exit angle, set by the input beamsteerer. A small silicon prism 44B optically contacted to the underside of the medium/substrate can be used on the output of the medium 18 to direct the light beam into a desired angle into the output liquid-crystal electro-optic beamsteerer 32B.

In another aspect of the current invention, by extending the optical path reflector in the other dimension to form a "window pane," then hundreds of time delay control devices or delay channels may be integrated into a single unit with the result that the device size per time delay device may become very small when compared to other approaches. In one example this may be on the order of 10 grams of silicon per time delay device or channel.

One example of this integration is schematically shown in FIG. 7. In one example, a device 50 has multiple (e.g., 200) light beams 12 that enter along two edges for a total of 400 time delay devices (or 400 channels) on a single pane of silicon. Tapered waveguide couplers may be fabricated on 0.55 mm thick silicon wafers and optically contacted to the edge of the windowpane optical path reflector. Silicon reflecting prisms may be optically contacted to the lower edges. In addition, a frame-like assembly of fibers and GRIN lens collimators may be affixed over the top of the device providing input and output optical fibers. Each fiber collimator may be aligned and fixed to the input/output tapered coupler using techniques common to the telecom industry. In one example a final device 50 may house 400 independently addressable time delay devices in an outer package about 1 foot on a side, and in the range of 1-2 inches thick.

Figure 8:
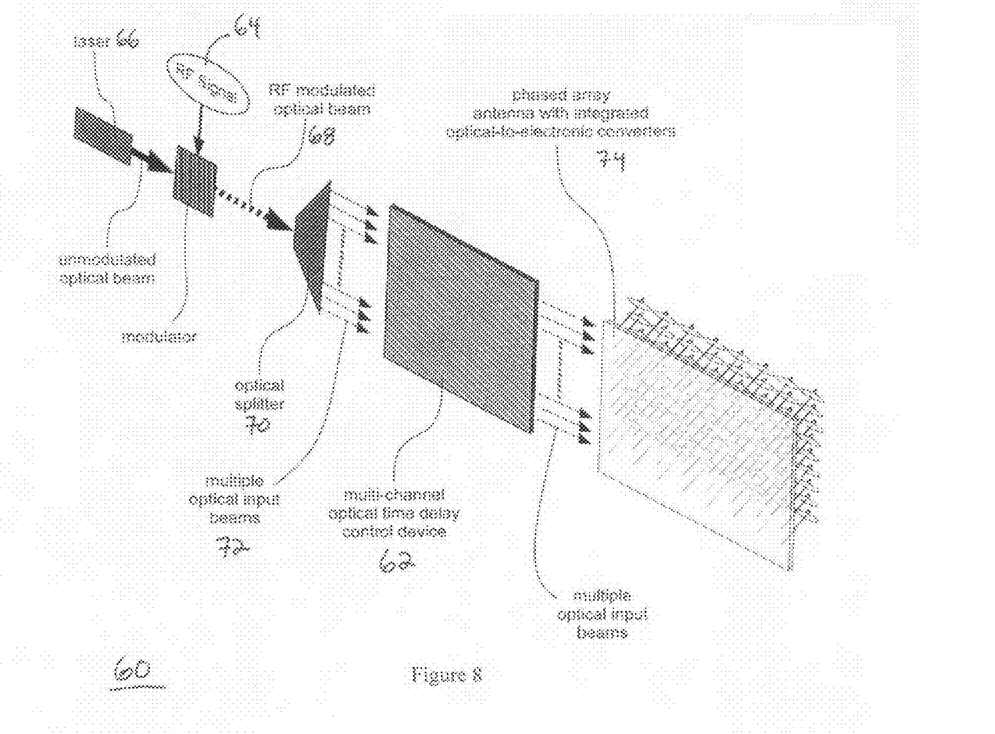
FIG. 8 illustrates an example a phased array antenna system that utilizes an embodiment of the present invention. In this example, the slim "window-pane" design (actually a sheet of silicon) may utilize liquid crystal waveguides to provide for a completely non-mechanical and robust, highly integrated (e.g., 1000 separate channels) device.

Examples where embodiments of the present invention may be used include, but are not limited to, optical computing, interferometry, optical coherence tomography, and others. In one particular example, by controllably altering the time delay relationship between elements in a phased array antenna (PAA) one may non-mechanically steer and/or focus the array's emitting radiation pattern. There are numerous and important applications of PAAs, for both civilian and defense needs As another aspect of the invention, FIG. 8 shows a schematic of a possible embodiment for a phased array antenna system 60 that may utilize a multi-channel optical time delay control device 62 as disclosed herein. In this example an electronic RF signal 64 may be encoded or modulated onto a laser beam 66. This modulated laser beam 68 may then be split by an optical splitter 70 into multiple, identical sub-beams 72. Each sub-beam 72 may then enter into, pass through, and then exit from the device 62. The device 62 can control and selectively alter the total transit time or time delay of each sub-beam 72. Each sub-beam of light, each with the RF signal encoded onto it, may then be converted back into an electronic signal and sent to an emitting antenna-array element 74. By controllably altering the transit time for each sub-beam of light, the phase of the RF radiation emitted from each antenna-array element 74 may then also be controllably altered. Since the radiation emitted from the entire antenna array 74 will be the summed interference of the radiation from all of the individual antenna array elements, by controllably altering the phase of each element, non-mechanical steering and/or focusing of the entire radiation pattern can be achieved.

Optical Time Delay Control Device Examples

Table 1 shows two possible optical path reflector designs which are provided by way of example only and do not limit the scope of the invention. The first design example provides a 14 ns tunable delay with 6-bit resolution. The 6-bit time delay device may tune from 106 to 170 bounces, which keeps θ, as shown in FIGS. 1-2, small over its tuning range. By starting at a relatively small value of θ the step increment in the time delay δτ becomes independent of both the number of bounces and the delay value Δτ.

TABLE 1

Design examples for different optical path reflectors, dependent on the system requirements.

| Delay | 20 ns | | 14 ns |
|---|---|---|---|
| Resolution | 76 ps | | 220 ps |
| | (8-bit) | | (6-bit) |
| $N_{max}$ | 427 | | 170 |
| $N_{min}$ | 171 | | 106 |
| $\theta_{min}$ | 16.3° C. | | 5.9° C. |
| $\theta_{max}$ | 36.2° C. | | 9.4° C. |
| Mat'l | Glass (n = 1.9) | Silicon (n = 3.45) | Silicon |
| L × L × H | 1230 × 1230 × 4.9 mm | 675 × 675 × 2.7 mm | 282 × 282 × 8 mm |
| $\omega_0$ | 1 mm | 0.45 | 0.45 mm |
| $N_{spots}$ | 550 | 550 | 100 |
| # True Time Delay(TTD) Channels/Pane | 1000 | 1000 | 400 |

Furthermore, starting from a high number of bounces reduces the requirements on the electro-optic beamsteerer. The most meaningful figure of merit for a beamsteerer is how many resolved spots it creates in the far field. The larger the number of spots, the harder the beamsteer is to make. (The number of resolved spots is the total steering range divided by the spreading angle of the Gaussian beam). Table 1 shows that a 6-bit time delay device with 64 addressable states requires a beamsteerer with 100 resolvable spots indicating less than 100% efficient use of the beamsteerer. For small θ ($N_{min} \gg 1$) one can show that $$N_{spots} \cong \frac{N_{max}}{N_{min}} \frac{\Delta\tau}{\delta\tau}$$

where Δτ/δτ is the total time delay divided by the step size or the number of states. This equation shows that $N_{spots}$ approaches Δτ/δτ for large $N_{min}$ ($N_{max}/N_{min} \sim 1$). For $N_{min}=1$, the required resolution for the beamsteerer becomes much larger. In fact, for $N_{min}=1$ we can show $$N_{spots} \sim \pi N^2 \frac{H}{L}$$

giving $N_{spots} \sim 370$ for the device in Table 1. The last relation also shows how it helps to have L>>H. For a square shaped reflector $N_{spots}$ can exceed 4000.

The optical path reflector may be long and thin, be made of a high index material, and start with a large number of reflections. In this case, the beamsteerer may be well matched to the number of delay states.

Table 1 also shows a design example with 20 ns of delay control, and 8-bit resolution. A beamsteering actuator with $N_{spots}=550$ is possible with liquid crystal waveguide technology.

In one example of a liquid crystal waveguide beamsteerer, the waveguide may be fabricated using ion-beam-sputtering deposition on 5 mm silicon substrates. In one example, first a 0.6 μm layer of silica may be deposited followed by a 1.2 μm thick layer of silica deposited through a shadow mask spaced 2.5 mm away from the substrate. Since ion-beam sputtering may be directional in nature, the offset shadow mask deposition may provide an s-tapered silica film much like the design shown in FIG. 4. In one example, one may polish the silicon input facet at an angle close to Brewster's angle, which directs the beam in the forward direction.

Described below is another example of an optical time delay control device in which the device is designed to provide tuning over >20 nanoseconds of optical delay. It is understood that this example is provided for illustrative purposes only, and does not limit the scope of embodiments of the present invention. In one example, an optical time delay device may be constructed from an 8 inch diameter silicon boule. The silicon may be grown via a magnetic Czochralski process (this type of silicon is referred to herein as magnetic Czochralski silicon), and it may be un-doped or slightly doped to minimize free carrier absorptions. In one example the resistivity of the silicon may be greater than 1000 Ohm-cms with an optical absorption coefficient of less than $10^{-3}$ cm$^{-1}$.

In one example, a wafer or disk may be cut from the eight inch diameter silicon boule with a thickness of approximately 10 millimeters. This wafer may be double side polished with a total thickness variation across the wafer of less than 2 microns. Optical mirrors may then be applied to both sides of the polished wafer. In one example the mirrors may be applied with an ion-beam sputtering process yielding an optical reflectivity of greater than 99.99% for incidence angles from approximately 10 degrees to approximately 2 degrees as defined with respect to the wafer normal. In one example the mirrors are constructed via an interference stack of dielectric layers.

In one example the polished wafer with mirrors may have protective glass pieces affixed to the outside to protect the mirrors. This wafer, with protective glass pieces, may then be diced into strip of approximately 1 to 4 centimeters wide, or wide enough to avoid clipping of an input optical beam. This diced strip may now be described as a parallel-piped with mirrors on the top and bottom surface. At two ends of the top surface the mirror may be removed via an optical polishing step wherein a bevel at approximately 5 degrees may be created. This bevel will both remove a section of the top mirrors, thereby allowing the optical beam to enter and exit the device, and be chosen to avoid total internal reflection for the optical beam as it exits the device. In this way an entrance bevel and an exit bevel may be created.

In one example this parallel-piped may be mounted on a rotation platform with the optical entrance point set at the center of rotation. A laser beam with a wavelength of 1.55 microns and a collimated beam waist of 1 millimeter may be impingent onto the parallel-piped piece in a region adjacent to the end of the top surface mirror, i.e., in the polished bevel section. This optical beam will then enter the parallel-piped device and bounce back and forth between the top surface mirror and the bottom surface mirror, until it leaves the device through the exit bevel. In one example the laser beam may be intensity modulated with a lithium-niobate electro-optic modulator to create 2 nanosecond long optical pulses. These optical pulses enter into the parallel-piped structure through the entrance bevel, they bounce through the structure, and finally they exit the structure through the exit bevel. By rotating the rotation platform the angle at which the optical beam enters the device, i.e., the input angle, may be controllably altered. In one example this angle may be varied from approximately 11.3 degrees to approximately 3.8 degrees, which will alter the number of times that the optical beams bounces or reflects from the bottom surface mirror. In one example the number of bottom surface mirror reflections may be controllably altered over a range exceeding 20 nanoseconds, as shown in Table 2.

TABLE 2

Example operation of an optical time delay control device.

| Angle (degrees) | Relative Time Delay (nanoseconds) | # of Bottom Surface Mirror Reflections | Optical Throughput (%) |
|---|---|---|---|
| 11.30 | 0.00 | 51 | 0.56 |
| 11.01 | 0.21 | 52 | 0.68 |
| 10.72 | 0.42 | 53 | 0.73 |
| 10.43 | 0.63 | 54 | 0.87 |
| 10.15 | 1.26 | 57 | 0.85 |
| 9.86 | 1.68 | 59 | 0.87 |
| 9.57 | 2.09 | 61 | 0.88 |
| 8.71 | 3.56 | 68 | 0.86 |
| 8.42 | 3.77 | 69 | 0.85 |
| 8.13 | 4.18 | 71 | 0.91 |
| 7.85 | 4.81 | 74 | 0.87 |
| 7.56 | 5.65 | 78 | 0.83 |
| 7.27 | 6.07 | 80 | 0.85 |
| 6.98 | 6.90 | 84 | 0.87 |
| 6.70 | 7.74 | 88 | 0.86 |
| 6.41 | 9.41 | 96 | 0.85 |
| 6.12 | 10.46 | 101 | 0.84 |
| 5.83 | 11.29 | 105 | 0.81 |
| 5.55 | 12.55 | 111 | 0.81 |
| 5.26 | 13.18 | 114 | 0.77 |
| 4.97 | 14.22 | 119 | 0.72 |
| 4.68 | 15.68 | 126 | 0.76 |
| 4.40 | 16.73 | 131 | 0.76 |
| 4.11 | 18.40 | 139 | 0.71 |
| 3.82 | 20.08 | 147 | 0.70 |

In the example of Table 2 the optical output beam may be detected with a high speed photodetector (10 GHz) from Electro-Optic Technologies (EOT). This may be used to record the light pulses after traveling through the optical time delay control device. A high speed digital oscilloscope, which may be triggered from the electro-optic modulator driver, may be used to measure the delay or transit time as the optical input angle is controllably altered. In one example the high speed detector may be mounted onto the same rotation stage as the parallel-piped structure such that alignment is maintained as the rotation platform is rotated. The optical detector may also be used to measure the intensity of the optical beam as it exits the device, thereby providing the total optical throughput. In this example the Fresnel reflections from the input and exit bevel have been subtracted from the total optical throughput. One could apply anti-reflection coatings onto the entrance and exit bevel to suitably reduce the Fresnel reflections.

In one example, the dimensions of the medium 18 of the optical path reflector 14 are 180 millimeters in length, 8.6 millimeters in height, and 30 millimeters in width.

Embodiments of the present invention may be used in conjunction with conventional digital and analog circuitry, either separately or integrated on a single integrated circuit. For instance, the voltage or current applied to one or more thermal control electrodes may be controlled by a microprocessor or other logic or programmable logic devices, and such logic may be included on-chip with the waveguide.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the invention has been particularly shown and described with reference to embodiments thereof, it will be understood by those skilled in the art that various other changes in the form and details may be made without departing from the spirit and scope of the invention.

The invention claimed is:

1. An optical time delay control device for controllably altering the transit time of an optical beam traveling through the device, the optical beam having a wavelength in a range from 1 to 2.5 microns and a transit time of the optical beam is controllably alterable by greater than about 1 nanosecond, the device comprising:
    an optically transparent solid medium for receiving the optical beam, the optically transparent solid medium having an optical absorption coefficient of less than about $10^{-3}$ cm$^{-1}$, wherein at least a portion of the medium is generally a parallelepiped shape characterized by a height, length and width, wherein the length is larger than the height;
    two mirrors affixed to two opposing surfaces of the optically transparent solid medium, so that during operation the optical beam reflects between the two mirrors as the optical beam travels through the optically transparent medium; and
    an angle actuator for controllably altering the angle at which the optical beam enters into the optically transparent medium from a first angle to at least a second angle, thereby controllably altering a number of reflections between the two mirrors and thereby controllably altering the time for the optical beam to travel through the optically transparent solid medium from a first transit time to a second transit time, such that the difference between the first and second transit times is greater than about 1 nanosecond.

2. The device of claim 1, wherein the optically transparent solid medium is constructed from silicon.

3. The device of claim 1, wherein the mirrors are constructed from a stack of dielectric layers and have a reflectivity greater than about 99.99% for angles of incidence less than the total internal reflection angle.

4. The device of claim 1, wherein the angle actuator is a liquid crystal waveguide beamsteerer.

5. The device of claim 1, wherein the optically transparent solid medium is constructed from magnetic Czochralski silicon.

6. The device of claim 1, wherein the optically transparent solid medium is configured for a low and constant insertion loss over the transit time.

7. The device of claim 6, wherein the optical beam is attenuated a small amount as the optical beam traverses the parallelepiped shape, and attenuation does not appreciably change as delay is altered.

8. The device of claim 1, wherein the optically transparent solid medium has an index of refraction greater than about 1.85.

9. The device of claim 1, wherein the angle at which the optical beam enters into the optically transparent medium is controllably adjustable from a first angle to at least as second angle such that a number of reflections on at least one of the two mirrors varies from at least 50 at the first angle to at least 55 at the second angle.

10. The device of claim 1, wherein a spot size ($\omega_o$) of the optical beam entering into the optically transparent medium defined such that a total optical path length is less than twice a Rayleigh length of the optical beam as the transit time is controllably altered over more than 1 nanosecond.

* * * * *